US010399894B2

United States Patent

Hotta et al.

(10) Patent No.: US 10,399,894 B2
(45) Date of Patent: Sep. 3, 2019

(54) GLASS SHEET AND METHOD FOR PRODUCING GLASS SHEET

(71) Applicant: Nippon Sheet Glass Company, Limited, Tokyo (JP)

(72) Inventors: Hirofumi Hotta, Hyogo (JP); Kazuishi Mitani, Osaka (JP); Yasuhiro Saito, Osaka (JP)

(73) Assignee: NIPPON SHEET GLASS COMPANY, LIMITED, Tokyo (JP)

(*) Notice: Subject to any disclaimer, the term of this patent is extended or adjusted under 35 U.S.C. 154(b) by 0 days.

(21) Appl. No.: 14/777,280

(22) PCT Filed: Mar. 18, 2014

(86) PCT No.: PCT/JP2014/001543
§ 371 (c)(1),
(2) Date: Sep. 15, 2015

(87) PCT Pub. No.: WO2014/148046
PCT Pub. Date: Sep. 25, 2014

(65) Prior Publication Data

US 2016/0023946 A1 Jan. 28, 2016

(30) Foreign Application Priority Data

Mar. 19, 2013 (JP) ................................ 2013-056557

(51) Int. Cl.
*C03C 21/00* (2006.01)
*C03C 15/00* (2006.01)
(Continued)

(52) U.S. Cl.
CPC ............ *C03C 21/007* (2013.01); *C03B 18/02* (2013.01); *C03B 18/14* (2013.01); *C03C 3/087* (2013.01); *C03C 15/00* (2013.01); *C03C 21/002* (2013.01)

(58) Field of Classification Search
CPC ....... C03B 18/02; C03B 18/14; C03C 21/007; C03C 3/087; C03C 15/00; C03C 21/002
See application file for complete search history.

(56) References Cited

U.S. PATENT DOCUMENTS 5,093,196 A * 3/1992 Hecq ....................... C03C 21/00 428/410
2011/0267697 A1* 11/2011 Kohli ...................... C03C 15/00 359/609

(Continued)

FOREIGN PATENT DOCUMENTS

JP 61-205641 9/1986
JP WO 2008004480 A1 * 1/2008 ............ C03C 18/02

(Continued)

OTHER PUBLICATIONS

Machine Translation of WO 2008/004481 (Year: 2008).*

*Primary Examiner* — Prashant J Khatri
*Assistant Examiner* — Zachary M Davis
(74) *Attorney, Agent, or Firm* — Hamre, Schumann, Mueller & Larson, P.C.

(57) ABSTRACT

The glass sheet of the present invention is a glass sheet with a thickness of 1.6 mm or less produced by a float process in which a molten glass material is formed into a sheet on a molten metal. When one surface of the glass sheet kept in contact with the molten metal during the formation of the molten glass material into the glass sheet is defined as a first surface and the other surface of the glass sheet opposite to the first surface is defined as a second surface, at least the first surface has been subjected to a treatment for forming a densified dealkalized layer therein. An etching rate $ER_1$ (nm/min) of the first surface and an etching rate $ER_2$ (nm/min) of the second surface satisfy a relation of $ER_2$/

(Continued)

$ER_1 \leq 0.8$ when the first surface and the second surface are etched using 0.1 mass % hydrofluoric acid at 50° C. as an etching liquid.

6 Claims, 1 Drawing Sheet

(51) Int. Cl.

| | |
|---|---|
| ***C03B 18/02*** | (2006.01) |
| ***C03B 18/14*** | (2006.01) |
| ***C03C 3/087*** | (2006.01) |

(56) References Cited

U.S. PATENT DOCUMENTS

2015/0072129 A1* 3/2015 Okahata .................. C03C 15/00 428/220
2015/0079347 A1* 3/2015 Miyasaka ............... C03C 3/112 428/141
2016/0023945 A1* 1/2016 Suzuki .................... C03C 3/087 65/30.14

FOREIGN PATENT DOCUMENTS

JP WO 2008004481 A1 * 1/2008 ............. C03B 18/14
JP WO 2012005307 A1 * 1/2012 ........... C03C 21/002
JP WO 2012099002 A1 * 7/2012 ............. C03C 3/083
WO 02/051767 7/2002
WO 2008/004480 1/2008
WO 2008/004481 1/2008
WO 2012/099002 7/2012

* cited by examiner

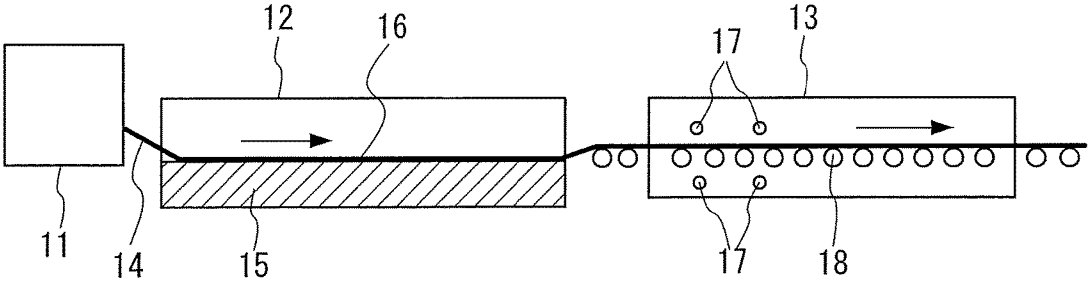
12
16
17
13
17
11
14
15
17
18

GLASS SHEET AND METHOD FOR PRODUCING GLASS SHEET

TECHNICAL FIELD

The present invention relates to a glass sheet produced by a float process and subjected to dealkalization treatment, and a method for producing the glass sheet.

BACKGROUND ART

Image displays of mobile devices such as mobile phones, smart phones, and personal digital assistants (PDAs) have a touch panel mounted therein or a cover glass disposed thereon for surface protection. As such a touch panel or a cover glass, a chemically strengthened thin glass sheet with a thickness of 1.6 mm or less is commonly used. Chemical strengthening by alkali ion exchange is commonly used as an effective method for chemically strengthening thin glass sheets.

When a glass sheet produced by a float process is chemically strengthened, the glass sheet may be warped. It has been believed that this warping is caused by a tin layer that is formed in one surface (bottom surface) of the glass sheet kept in contact with molten tin in a float bath by entry of the tin component into the glass. In other words, it has been believed that occurrence of warping of a glass sheet after chemically strengthening is caused by a difference in compressive stress between the bottom surface and the top surface (i.e., the other surface of the glass sheet kept out of contact with the molten tin during formation of the glass into the sheet). This difference in compressive stress is produced by the following mechanism: during chemical strengthening by alkali ion exchange, the presence of the tin layer formed in the bottom surface reduces the amount of K+ ions entering through the bottom surface, and as a result, makes it smaller than the amount of K+ ions entering through the top surface.

In a chemical strengthening method for float glass proposed in Patent Literature 1, the top surface of the glass kept out of contact with molten tin is subjected to chemical treatment for reducing the concentration of sodium ions in the top surface prior to chemical strengthening. It is believed that this chemical treatment restricts alkali ion exchange in the top surface during the chemical strengthening, leads to a decrease in the difference between the amount of alkali ions entering through the top surface and the amount of alkali ions entering through the bottom surface, and as a result, reduces warping of the glass sheet after the chemical strengthening. As used herein, the chemical treatment is a treatment in which an oxidizing gas such as chlorofluorocarbon gas, hydrogen fluoride (HF) gas, or sulfur dioxide ($SO_2$) gas is blown onto the surface of the glass sheet to allow the gas to react with the sodium component on the surface of the glass sheet.

On the other hand, in order to prevent damage to the surface of a glass sheet in the processes of producing, transporting, and processing the glass, it has been proposed to blow $SO_2$ gas onto the surface of the glass sheet in the production process to allow the $SO_2$ gas to react with an alkali component contained in the glass and thus to form a protective coating of sodium sulfate (salt cake) or the like on the glass surface (Patent Literature 2). Since the bottom surface is more susceptible to damage in the glass production process because it comes into contact with a conveyor roll, the protective coating needs to be sufficiently formed at least on the bottom surface.

CITATION LIST

Patent Literature

Patent Literature 1: JP 61(1986)-205641 A
Patent Literature 2: WO 2002/051767 A1

SUMMARY OF INVENTION

Technical Problem

With a growing demand for light weight mobile devices, glass sheets become thinner and thinner, and become more susceptible to warping by chemical strengthening. In addition, since the demand for highly damage-resistant, high quality glass sheets also increases, it becomes increasingly important to form a protective coating for preventing damage in the glass sheet production process.

When a glass sheet having been subjected to surface treatment to form a damage-preventing protective coating as proposed in Patent Literature 2 is subjected to chemical strengthening, even if the glass sheet has been subjected to chemical treatment as proposed in Patent Literature 1 prior to the chemical strengthening, warping of the glass sheet is not sufficiently reduced in some cases. This tendency is clearly observed particularly in thin glass sheets with thicknesses of 1.6 mm or less.

Accordingly, it is an object of the present invention to provide a glass sheet with reduced warping after chemical strengthening even if the glass sheet has been subjected to surface treatment for forming a damage-preventing protective coating thereon.

Solution to Problem

The surface treatment for glass by blowing $SO_2$ gas onto the glass surface to form a damage-preventing protective coating thereon is a treatment for removing an alkali component from the glass surface (dealkalization). As a result of intensive studies, the present inventors have found that the effect of this dealkalization needs to be considered to reduce warping after chemical strengthening. More specifically, the present inventors have found that a layer densified by dehydration condensation is formed on a dealkalized glass surface in some cases and this densified layer inhibits alkali ion exchange during chemical strengthening in the same manner as does a tin layer, and as a result, have arrived at the following glass sheet of the present invention, taking into consideration the presence of the densified layer.

The present invention provides a glass sheet with a thickness of 1.6 mm or less produced by a float process in which a molten glass material is formed into a sheet on a molten metal. When one surface of the glass sheet kept in contact with the molten metal during the formation of the molten glass material into the glass sheet is defined as a first surface and the other surface of the glass sheet opposite to the first surface is defined as a second surface, at least the first surface has been subjected to a treatment for forming a densified dealkalized layer therein. An etching rate $ER_1$ (nm/min) of the first surface and an etching rate $ER_2$ (nm/min) of the second surface satisfy a relation of $ER_2$/

$ER_1 \leq 0.8$ when the first surface and the second surface are etched using 0.1 mass % hydrofluoric acid at 50° C. as an etching liquid.

The present invention also provides a method for producing a glass sheet with a thickness of 1.6 mm or less. The method includes the steps of: (I) forming a molten glass material into a glass ribbon on a molten metal; and (II) subjecting at least one surface of the glass ribbon kept in contact with the molten metal in the step (I) to a treatment for forming a densified dealkalized layer therein so that an etching rate $ER_1$ (nm/min) of the one surface of the glass ribbon defined as a first surface and an etching rate $ER_2$ (nm/min) of the other surface of the glass ribbon defined as a second surface opposite to the first surface satisfy a relation of $ER_2/ER_1 \leq 0.8$ when the first surface and the second surface are etched using 0.1 mass % hydrofluoric acid at 50° C. as an etching liquid.

Advantageous Effects of Invention

The glass sheet of the present invention is a glass sheet produced by the float process and further subjected to dealkalization to form a damage-preventing protective coating on the surface thereof. In the glass sheet of the present invention, the ratio $ER_2/ER_1$ of the etching rate $ER_2$ of the second surface to the etching rate $ER_1$ of the first surface is set to 0.8 or less, taking into consideration not only alteration of the first surface of the glass caused by the molten metal used in the forming step but also alteration of the first and second surfaces of the glass caused by dealkalization and subsequent densification. In the glass sheet of the present invention, since the etching rates of the first and second surfaces satisfy the above relation, the effect of the altered first surface in inhibiting alkali ion exchange during chemical strengthening and the effect of the altered second surface in inhibiting alkali ion exchange during chemical strengthening are well balanced. Consequently, warping after chemical strengthening is reduced. In addition, according to the method of the present invention for producing a glass sheet, a glass sheet with reduced warping after chemical strengthening can be produced for the same reason.

BRIEF DESCRIPTION OF DRAWINGS

FIG. 1 is a schematic diagram showing an example of a system capable of carrying out the production method of the present invention.

DESCRIPTION OF EMBODIMENTS

Hereinafter, an embodiment of the present invention will be described in detail.

A glass sheet of the present embodiment is a glass sheet produced by a float process, which is a continuous glass sheet production method. In the float process, a glass material is melted in a float furnace and the molten glass material is formed into a sheet-shaped glass ribbon on a molten metal in a float bath. The glass ribbon thus obtained is annealed in an annealing furnace and then cut into glass sheets of a predetermined size. In the present embodiment, the case where molten tin is used as the molten metal is described. Hereinafter, one surface of a glass sheet kept in contact with molten tin in a float bath in the forming step is referred to as a bottom surface (first surface), while the other surface of the glass sheet kept out of contact with the molten tin is referred to as a top surface (second surface) opposite to the bottom surface.

Furthermore, in the glass sheet of the present embodiment, at least the bottom surface thereof has been subjected to dealkalization for forming a damage-preventing protective coating thereon and a subsequent treatment for forming a densified layer. As used herein, dealkalization refers to a treatment for bringing an alkali-reactive oxidizing gas into contact with the surface of the glass sheet so as to remove an alkali component from the glass. The removed alkali component reacts with the oxidizing gas, and as a result, a protective coating is formed on the surface of the glass sheet.

Instead of the alkali component removed from the glass by dealkalization, atmospheric water in various forms, such as in the form of proton ($H^+$) and oxonium ion ($H_3O^+$), enters the glass and forms a silanol group (≡Si—OH) in the dealkalized layer. Then, a siloxane bond (≡Si—O—Si≡) is formed by dehydration condensation of the silanol group. In this description, “densification” is defined as the state in which siloxane bonds are increased by this dehydration condensation. Since the glass surface having increased siloxane bonds is more resistant to etching, the degree of densification can be obtained by measuring the etching rate.

As an oxidizing gas, for example, sulfur dioxide ($SO_2$) gas can be used. $SO_2$ reacts with a component of the glass and forms alkali sulfate such as sodium sulfate on the surface of the glass sheet. This alkali sulfate serves as a protective coating. The oxidizing gas used herein may be a gas other than $SO_2$ gas as long as the gas can react with an alkali component in the glass to form a protective coating. It is not desirable to use a very effective dealkalizing gas such as hydrogen fluoride gas because not only it is not involved in forming a protective coating but also it etches the glass surface to make the surface rough. An inert gas such as air, nitrogen, or argon may be used as a carrier gas. The oxidizing gas may further contain water vapor.

The top surface also may be subjected to a treatment for forming a densified dealkalized layer. Even if $SO_2$ is blown only to the bottom surface, a portion of the blown $SO_2$ gas may move around to the top surface and treat the top surface.

In the glass sheet of the present invention, the etching rate $ER_1$ (nm/min) of the bottom surface and the etching rate $ER_2$ (nm/min) of the top surface satisfy a relation of $ER_2/ER_1 \leq 0.8$ when the bottom surface and the top surface are etched using 0.1 mass % hydrofluoric acid at 50° C. as an etching liquid. Since the bottom surface has been kept in contact with molten tin in the float bath, tin enters the glass through the bottom surface and a tin layer is formed therein. A layer densified by dehydration condensation through dealkalization is also formed in the bottom surface. The etching rate $ER_1$ of the bottom surface is determined by the altered layer composed of the tin layer and the densified layer. A layer densified by dehydration condensation through dealkalization may also be formed in the top surface, and in this case, the etching rate $ER_2$ of the top surface is determined by the layer densified by dehydration condensation through dealkalization and the like. Therefore, the etching rates $ER_1$ and $ER_2$ satisfying $ER_2/ER_1 \leq 0.8$ can be obtained by controlling the densified layers formed in the bottom surface and the top surface, that is, by controlling the degrees of densification by dealkalization of the bottom surface and the top surface.

The degrees of densification by dealkalization of the bottom surface and the top surface can be controlled by the amount of blown $SO_2$ gas, the surface(s) to which $SO_2$ gas is blown (only the bottom surface or both the bottom surface and the top surface), the temperature of dealkalization, etc. Densification is less likely to occur even if dealkalization is performed at a relatively low temperature. In the case of common soda lime glass, densification is more likely to occur when $SO_2$ gas is allowed to act on the glass at a temperature of about 500° C. or more. In order to form as much protective coating as possible without promoting densification so much, it is desirable to minimize the duration of action of $SO_2$ gas at 500° C. or more and to maximize the duration of action of $SO_2$ gas at lower temperatures (for example, less than 500° C.).

The tin layer in the bottom surface can be a factor that increases the etching rate. On the other hand, since the densified layer is more resistant to etching, it can be a factor that reduces the etching rate. Therefore, two phenomena, i.e., an increase in the etching rate by the tin layer and a decrease in the etching rate by the densified dealkalized layer, occur simultaneously in the bottom surface. On the other hand, the etching rate of the top surface depends on the densified dealkalized layer. Since the bottom surface is usually more susceptible to damage than the top surface, the amount of $SO_2$ acting on the bottom surface tends to be increased to form more protective coating. This leads to the predictable result that in conventional glass sheets, the etching rate of the bottom surface is comparable to or lower than the etching rate of the top surface even if the effect of the tin layer is added. In the glass sheet of the present embodiment, $ER_2/ER_1$ is 0.8 or less, which means that the degree of densification of the bottom surface is relatively low. The ratio $ER_2/ER_1$ of 0.8 or less makes it possible to achieve a good balance between alkali ion exchange in the top surface and that in the bottom surface and thus to reduce warping after chemical strengthening. Since warping after chemical strengthening can be reduced when $ER_1$ and $ER_2$ satisfies the relation of $ER_2/ER_1 \leq 0.8$, the values of $ER_1$ and $ER_2$ are not particularly limited.

It is desirable that $ER_1$ and $ER_2$ satisfy a relation of $ER_2/ER_1 \leq 0.7$. This ratio $ER_2/ER_1$ of 0.7 or less makes it possible to further reduce the amount of warping after chemical strengthening. It is possible, for example, to reduce the amount of warping of a glass sheet after chemical strengthening to 0.1% or less of the long side dimension of the glass sheet. In order to further reduce the amount of warping after chemical strengthening, it is more desirable that $ER_1$ and $ER_2$ satisfy a relation of $ER_2/ER_1 \leq 0.4$. In order to achieve a good balance of alkali ion exchange, $ER_2/ER_1$ is desirably 0.05 or more, and more desirably 0.1 or more.

Soda lime glass or aluminosilicate glass, which is commonly available for use as glass for chemical strengthening, can be used for the glass sheet, and the composition of the glass is not particularly limited. A thin glass sheet with a thickness of 1.6 mm or less is particularly susceptible to warping by chemical strengthening. Therefore, the thickness of the glass sheet of the present embodiment is 1.6 mm or less. In particular, when the present invention is applied to a thin glass sheet with a thickness of 1.1 mm or less, remarkable effects can be obtained.

The glass sheet of the present embodiment can be produced, for example, by a method including the steps of: (I) forming a molten glass material into a glass ribbon on molten tin (molten metal); and (II) subjecting at least one surface of the glass ribbon kept in contact with the molten tin in the step (I) to a treatment for forming a densified dealkalized layer therein so that an etching rate $ER_1$ (nm/min) of the one surface of the glass ribbon defined as a first surface and an etching rate $ER_2$ (nm/min) of the other surface of the glass ribbon defined as a second surface opposite to the first surface satisfy a relation of $ER_2/ER_1 \leq 0.8$ when the first surface and the second surface are etched using 0.1 mass % hydrofluoric acid at 50° C. as an etching liquid. This method can be carried out, for example, using a system shown in FIG. 1.

First, a glass material is melted in a float furnace 11. Molten glass 14 flowing from the float furnace 11 is fed into a float bath 12. The molten glass 14 thus fed into the float bath 12 is formed into a sheet-like glass ribbon 16 while spreading over molten tin 15 having a higher specific gravity than the glass in the float bath 12. As the glass flows along the float bath 12, the thickness of this glass ribbon 16 is adjusted and the glass ribbon 16 is cooled to provide a viscosity high enough to be pulled out of the bath 12. The cooled glass ribbon 16 is lifted off the float bath 12 and delivered to an annealing furnace 13. The annealing furnace 13 is provided with gas blowing nozzles 17 for dealkalization. The nozzles 17 are provided on both surface sides of the glass ribbon 16 so that gas can be blown onto both surfaces of the glass ribbon 16. The amount of the gas blown from the gas blowing nozzles 17 can be controlled by a controller (not shown). The annealing furnace 13 is further provided with a heating means and a cooling means (not shown), and thereby the dealkalization temperature can be set within a predetermined range. Thus, in the annealing furnace 13, the glass ribbon 16 is subjected to a treatment for forming a densified dealkalized layer therein at an appropriately adjusted treatment temperature and with an appropriately adjusted amount of blown $SO_2$ gas, so that $ER_1$ and $ER_2$ satisfy the relation of $ER_2/ER_1 \leq 0.8$. Thereafter, the glass ribbon 16 is cut into glass sheets of a predetermined size.

In order to chemically strengthen the glass sheet of the present embodiment, it is desirable to further carry out, after the step (II), a step of (III) subjecting a glass sheet obtained by cutting the glass ribbon to chemical strengthening by alkali ion exchange. The amount of warping of the chemically strengthened glass sheet obtained by this step is reduced to a lower level, and thus this glass sheet has both high flatness and high strength.

EXAMPLES

Hereinafter, the present invention is described in more detail using examples. However, the present invention is not limited to the following examples, and other examples are possible as long as they do not depart from the gist of the present invention.

Examples 1 to 6

[Method for Producing Glass Sheet]

Glass sheets with a thickness of 0.33 mm were produced by a float process. First, a glass material was prepared so as to have the following composition of glass: 71.5% of $SiO_2$, 1.7% of $Al_2O_3$, 8% of CaO, 4% of MgO, 13.6% of $Na_2O$, 0.9% of $K_2O$, 0.2% of $SO_2$, and 0.1% of total iron (in terms of $Fe_2O_3$), where "%" means "mass %". This glass material was melted, and the molten glass material was formed into a sheet shape on molten tin in a float bath. Thereafter, in an annealing furnace, the bottom surface of the glass sheet was subjected to a treatment for forming a densified dealkalized layer therein by blowing $SO_2$ gas onto the bottom surface thereof. The $SO_2$ gas was blown only to the bottom surface, but a portion of the $SO_2$ gas moved around to the top surface, and the top surface also was subjected to the same treatment. Table 1 shows the amount of blown $SO_2$ gas in each example. Table 1 also shows the temperature at which the $SO_2$ gas was blown, i.e., the treatment temperature, in each example.

[Method for Measuring Etching Rate]

The etching rate of the glass sheet obtained was evaluated based on the etching rate calculated from the etching amount obtained by immersing the glass sheet in 0.1 mass % hydrofluoric acid at 50° C. as an etching liquid for 3 minutes. The etching amount was measured by applying a hydrofluoric acid-resistant masking agent onto a portion of the unetched glass sheet, subjecting the glass sheet to etching, and measuring the difference in the level between the masked portion and the etched portion formed by etching. The level difference was measured using a thickness meter (Alpha-Step 500 manufactured by KLA-Tencor Corporation). Table 1 shows the measurement results of the etching rates ($ER_1$ and $ER_2$) and the etching rate ratios ($ER_2/ER_1$) obtained from these measurement results. Here, the etching time (3 minutes) was set so that only the etching rate of the altered layer formed in the surface of the glass sheet could be measured independently of the etching rate of the bulk layer inside the glass sheet. Specifically, a plurality of data of changes in the etching rate with respect to the etching time were collected, and the etching depth was plotted on the vertical axis while the time was plotted on the horizontal axis. When the plots were connected, a straight line having a gentle slope was observed between the plots in a short time region, while a straight line having a steeper slope was observed between the plots in a longer time region. Thus, a bending point was observed between the lines. It was presumed that the etching depth at which this bending point was observed was the depth at which the composition of the altered layer changed to that of the bulk layer. Therefore, in this case, the etching time (3 minutes in this case) was selected so that the etching depth did not reach the bulk layer.

[Method for Chemical Strengthening]

A sample having a size of 370 mm×470 mm and a sample having a size of 50 mm×50 mm were cut out from each glass sheet. These samples were subjected to chemical strengthening. First, these samples were washed, and then immersed in a molten salt of $KNO_3$. The temperature of the molten salt of $KNO_3$ was set to 460° C., and the immersion time was set to 30 minutes. The samples were taken out from the molten salt of $KNO_3$ and then cooled, followed by washing to remove $KNO_3$ attached to the samples.

[Method for Measuring Amount of Warping]

As for the sample having a size of 370 mm×470 mm, the chemically strengthened one was placed on a flat surface plate in such a manner that the convex-warped top surface thereof faced downward, and the distances at eight points between the sample and the surface plate were measured using a gap gauge. The maximum value of the distance was used as the amount of warping. Table 1 shows the results.

As for the sample having a size of 50 mm×50 mm, two opposite lateral sides of the chemically strengthened one were supported in such a manner that the convex-warped top surface faced upward, and the height-direction coordinate of the center of the top surface was measured. Next, the sample was turned over, and the height-direction coordinate of the center of the top surface was measured in the same manner. One half of the sum of the two measurement values was used as the amount of warping. For the measurement of the coordinates, a non-contact three-dimensional profile measurement system ("NH-3N" manufactured by Mitaka Kohki Co., Ltd.) was used. The effect of deformation of each sample under its own weight was eliminated from the amount of warping thus obtained by performing the above-described measurement on both the top surface and the bottom surface. Table 1 shows the results.

Comparative Examples 1 to 3

Glass sheets were produced in the same manner as in Examples 1 to 6 except that the treatment was performed with the amounts of blown $SO_2$ gas and at the treatment temperatures as shown in Table 1. For each of the glass sheets obtained, the etching rate was measured, chemical strengthening was performed, and the amount of warping was measured in the same manner as in Examples 1 to 6. Table 1 shows the results.

TABLE 1

|  | Examples | | | | | | Comparative Examples | | |
| --- | --- | --- | --- | --- | --- | --- | --- | --- | --- |
|  | 1 | 2 | 3 | 4 | 5 | 6 | 1 | 2 | 3 |
| Etching rate of bottom surface: $ER_1$ (nm/min) | 10 | 10 | 11 | 11 | 12 | 11 | 7 | 8 | 5 |
| Etching rate of top surface: $ER_2$ (nm/min) | 8 | 8 | 6 | 8 | 7 | 7 | 8 | 7 | 5 |
| $ER_2/ER_1$ | 0.8 | 0.8 | 0.6 | 0.7 | 0.5 | 0.6 | 1.1 | 0.9 | 1.0 |
| Amount of warping of chemically strengthened 370 mm × 470 mm sample (mm) | 0.83 | 0.68 | 0.48 | 0.47 | 0.5 | 0.52 | 1.28 | 1.23 | 1.46 |
| Amount of warping of chemically strengthened 50 mm × 50 mm sample (μm) | 62.8 | 68.8 | 54.5 | 44.7 | 57.5 | 57.5 | 69.2 | 69.5 | 84.2 |
| Amount of blown $SO_2$ gas (cc/min) | 12,000 | 28,000 | 16,000 | 10,000 | 12,000 | 16,000 | 16,000 | 16,000 | 30,500 |
| Treatment temperature (° C.) | 570 to 410 | 560 to 400 | 570 to 420 | 580 to 410 | 560 to 410 | 560 to 400 | 580 to 440 | 580 to 450 | 580 to 430 |

In each of the glass sheets of Examples 1 to 6, the etching rate of the bottom surface was 10 nm/min or more, and the ratio ($ER_2/ER_1$) between the etching rate ($ER_1$) of the bottom surface and the etching rate ($ER_2$) of the top surface was 0.8 or less. As described above, the bottom surface is more susceptible to etching because a tin layer is formed in the bottom surface kept in contact with molten tin during formation into a sheet, and thus its etching rate tends to increase. On the other hand, the dealkalized glass surface is less susceptible to etching because a layer densified by dehydration condensation is formed therein, and thus its etching rate tends to decrease. Presumably, in the bottom surface of each of the glass sheets of Examples 1 to 6, an increase in the etching rate by the tin layer and a decrease in the etching rate by the densified dealkalized layer occurred simultaneously, resulting in an etching rate of 10 to 12 nm/min. In the top surface, only a phenomenon of a decrease in the etching rate by the densified dealkalized layer occurred, resulting in a lower etching rate of 6 to 8 nm/min. That is, in Examples 1 to 6, the degree of densification of the bottom surface by dealkalization was reduced to a relatively low level, and therefore the relation of $ER_2/ER_1 \leq 0.8$ was achieved. Thereby, in each of the glass sheets of Examples 1 to 6, a good balance was achieved between alkali ion exchange in the top surface and that in the bottom surface during chemical strengthening and thus warping was reduced.

In each of the samples of Examples 3 to 6 having a ratio $ER_2/ER_1$ of 0.7 or less, the amount of warping was smaller than that of each of the samples of Examples 1 and 2 having a ratio $ER_2/ER_1$ of 0.8.

On the other hand, in each of the glass sheets of Comparative Examples 1 to 3, the value of $ER_2/ER_1$ was more than 0.8. That is, in the glass sheets of Comparative Examples 1 to 3, the degree of densification of the bottom surface was higher than that in the glass sheets of Examples 1 to 6, and thus the etching rate of the bottom surface was lower. As a result, the degree of densification-derived inhibition of alkali ion exchange in the bottom surface increased during chemical strengthening, and alkali ion exchange in the top surface and that in the bottom surface were ill-balanced. This is presumably the reason why the amount of warping increased.

Example 7

A glass sheet was produced in the same manner as in Examples 1 to 6 except that the thickness of the glass sheet was 0.4 mm, that $SO_2$ gas was blown onto both the top surface and the bottom surface thereof, and that the treatment was performed with the amount of blown $SO_2$ gas and at the treatment temperature as shown in Table 2. For the glass sheet obtained, the etching rate was measured, chemical strengthening was performed, and the amount of warping was measured in the same manner as in Examples 1 to 6. Table 2 shows the results.

Comparative Example 4

A glass sheet was produced in the same manner as in Examples 1 to 6 except that the thickness of the glass sheet was 0.4 mm and that the treatment was performed with the amount of blown $SO_2$ gas and at the treatment temperature as shown in Table 2. For the glass sheet obtained, the etching rate was measured, chemical strengthening was performed, and the amount of warping was measured in the same manner as in Examples 1 to 6. Table 2 shows the results.

TABLE 2

| | Example 7 | Comparative Example 4 |
|---|---|---|
| Etching rate of bottom surface: $ER_1$ (nm/min) | 5.4 | 5.2 |
| Etching rate of top surface: $ER_2$ (nm/min) | 3.8 | 5 |
| $ER_2/ER_1$ | 0.7 | 1.0 |
| Amount of warping of chemically strengthened 370 mm × 470 mm sample (mm) | 0.52 | 0.99 |
| Amount of warping of chemically strengthened 50 mm × 50 mm sample (μm) | 43.4 | 48.6 |
| Amount of $SO_2$ gas blown to bottom surface (cc/min) | 30,000 | 30,000 |
| Amount of $SO_2$ gas blown to top surface (cc/min) | 16,000 | 0 |
| Treatment temperature (° C.) | 560 to 420 | 560 to 420 |

Examples 8 to 11

Glass sheets were produced in the same manner as in Examples 1 to 6 except that the thickness of the glass sheets was 0.7 mm and that the treatment was performed with the amounts of blown $SO_2$ gas and at the treatment temperatures as shown in Table 3. For each of the glass sheets obtained, the etching rate was measured, chemical strengthening was performed, and the amount of warping was measured in the same manner as in Examples 1 to 6 except that the chemical strengthening was performed under the following conditions: the temperature of the molten salt of $KNO_3$: 420° C.; and the immersion time: 4 hours. Only the samples having a size of 370 mm×470 mm were subjected to the chemical strengthening and the measurement of the amount of warping. Table 3 shows the results.

Comparative Examples 5 and 6

Glass sheets were produced in the same manner as in Examples 1 to 6 except that the thickness of the glass sheets was 0.7 mm and that the treatment was performed with the amounts of blown $SO_2$ gas and at the treatment temperatures as shown in Table 3. For each of the glass sheets obtained, the etching rate was measured, chemical strengthening was performed, and the amount of warping was measured in the same manner as in Examples 1 to 6 except that the chemical strengthening was performed under the following conditions: the temperature of the molten salt of $KNO_3$: 420° C.; and the immersion time: 4 hours. Only the samples having a size of 370 mm×470 mm were subjected to the chemical strengthening and the measurement of the amount of warping. Table 3 shows the results.

TABLE 3

| | Examples | | | | Comparative Examples | |
|---|---|---|---|---|---|---|
| | Ex. 8 | Ex. 9 | Ex. 10 | Ex. 11 | Com. Ex. 5 | Com. Ex. 6 |
| Etching rate of bottom surface: $ER_1$ (nm/min) | 9.7 | 13.5 | 15.4 | 10.3 | 6.6 | 7.1 |
| Etching rate of top surface: $ER_2$ (nm/min) | 6.5 | 6.7 | 6.6 | 1.8 | 6.0 | 7.0 |
| $ER_2/ER_1$ | 0.7 | 0.5 | 0.4 | 0.2 | 0.9 | 1.0 |

TABLE 3-continued

| | Examples | | | | Comparative Examples | |
|---|---|---|---|---|---|---|
| | Ex. 8 | Ex. 9 | Ex. 10 | Ex. 11 | Com. Ex. 5 | Com. Ex. 6 |
| Amount of warping of chemically strengthened 370 mm × 470 mm sample (mm) | 0.45 | 0.37 | 0.31 | 0.23 | 1.29 | 1.06 |
| Amount of $SO_2$ gas blown to bottom surface (cc/min) | 30,000 | 30,000 | 16,000 | 30,000 | 28,000 | 16,000 |
| Amount of $SO_2$ gas blown to top surface (cc/min) | 0 | 0 | 0 | 20,000 | 0 | 0 |
| Treatment temperature (° C.) | 540 to 410 | 510 to 390 | 510 to 390 | 540 to 420 | 540 to 380 | 540 to 380 |

In the glass sheet samples having a thickness of 0.7 mm, the amount of warping after chemical strengthening in the samples of Examples 8 to 11 satisfying $ER_2/ER_1$ of 0.8 or less was smaller than that in the samples of Comparative Examples 5 and 6 having $ER_2/ER_1$ of more than 0.8.

The results obtained in the above Examples 1 to 11 and Comparative Examples 1 to 6 revealed that in a glass sheet having $ER_2/ER_1$ of 0.8 or less, the difference between the amount of alkali ions exchanged in the top surface and that in the bottom surface by chemical strengthening was reduced and thereby warping of the glass sheet was reduced.

INDUSTRIAL APPLICABILITY

The glass sheet of the present invention has a surface densified by dehydration condensation through dealkalization and further has reduced warping after chemical strengthening. Therefore, the glass sheet of the present invention is suitable for applications that require thinness and strength, for example, for use as a cover glass for protecting the surface of an image display of a mobile device.

The invention claimed is:

1. A glass sheet with a thickness of 1.6 mm or less produced by a float process in which a molten glass material is formed into a sheet on a molten metal, wherein when one surface of the glass sheet kept in contact with the molten metal during the formation of the molten glass material into the glass sheet is defined as a first surface and the other surface of the glass sheet opposite to the first surface is defined as a second surface, at least the first surface has been subjected to a single treatment for forming a densified dealkalized layer therein at a treatment temperature at or within a range of 410° C. to 580° C., and an etching rate $ER_1$ (nm/min) of the first surface and an etching rate $ER_2$ (nm/min) of the second surface satisfy a relation of $ER_2/ER_1 \leq 0.8$ when the first surface and the second surface are etched using 0.1 mass % hydrofluoric acid at 50° C. as an etching liquid, and the etching rate $ER_1$ is 10 nm/min or more.

2. The glass sheet according to claim 1, wherein $ER_1$ and $ER_2$ satisfy a relation of $ER_2/ER_1 \leq 0.7$.

3. The glass sheet according to claim 2, wherein the second surface has been subjected to a treatment for forming a densified dealkalized layer therein.

4. The glass sheet according to claim 1, wherein the second surface has been subjected to a treatment for forming a densified dealkalized layer therein.

5. A method for producing a glass sheet with a thickness of 1.6 mm or less, comprising the steps of:

(I) forming a molten glass material into a glass ribbon on a molten metal; and (II) subjecting at least one surface of the glass ribbon kept in contact with the molten metal in the step (I) to a single treatment for forming a densified dealkalized layer therein at a treatment temperature at or within a range of 410° C. to 580° C. so that an etching rate $ER_1$ (nm/min) of the one surface of the glass ribbon defined as a first surface and an etching rate $ER_2$ (nm/min) of the other surface of the glass ribbon defined as a second surface opposite to the first surface satisfy a relation of $ER_2/ER_1 \leq 0.8$ when the first surface and the second surface are etched using 0.1 mass % hydrofluoric acid at 50° C. as an etching liquid, wherein the treatment temperature for a portion of the treatment for forming the densified dealkalized layer is less than 500° C.

6. The method for producing a glass sheet according to claim 5, further comprising, after the step (II), a step of (III) subjecting a glass sheet obtained by cutting the glass ribbon to chemical strengthening by alkali ion exchange.

* * * * *